(12) United States Patent
Dolganow et al.

(10) Patent No.: US 8,165,024 B2
(45) Date of Patent: Apr. 24, 2012

(54) USE OF DPI TO EXTRACT AND FORWARD APPLICATION CHARACTERISTICS

(75) Inventors: Andrew Dolganow, Kanata (CA); Keith Allan, Kanata (CA); Colin Leon Kahn, Morris Plains, NJ (US)

(73) Assignee: Alcatel Lucent, Paris (FR)

( * ) Notice: Subject to any disclaimer, the term of this patent is extended or adjusted under 35 U.S.C. 154(b) by 564 days.

(21) Appl. No.: 12/078,701

(22) Filed: Apr. 3, 2008

(65) Prior Publication Data

US 2009/0252148 A1    Oct. 8, 2009

(51) Int. Cl.
*H04L 12/26* (2006.01)
*H04L 12/56* (2006.01)
(52) U.S. Cl. .............. 370/237; 370/235; 370/395.43
(58) Field of Classification Search .............. None
See application file for complete search history.

(56) References Cited

U.S. PATENT DOCUMENTS

| | | | |
|---|---|---|---|
| 6,320,863 B1 * | 11/2001 | Ramfelt .............. | 370/404 |
| 6,587,470 B1 * | 7/2003 | Elliot et al. .......... | 370/404 |
| 6,678,832 B1 * | 1/2004 | Gotanda .............. | 713/400 |
| 6,741,595 B2 * | 5/2004 | Maher et al. .......... | 370/392 |
| 6,799,030 B2 * | 9/2004 | Barber et al. .......... | 455/343.1 |
| 7,362,763 B2 * | 4/2008 | Wybenga et al. ........ | 370/395.1 |
| 7,508,764 B2 * | 3/2009 | Back et al. ........... | 370/235 |
| 7,606,147 B2 * | 10/2009 | Luft et al. ............. | 370/229 |
| 2007/0162289 A1 * | 7/2007 | Olsson et al. .......... | 705/1 |
| 2008/0123660 A1 * | 5/2008 | Sammour et al. ....... | 370/395.21 |
| 2008/0214189 A1 * | 9/2008 | Taaghol .............. | 455/432.2 |

* cited by examiner

*Primary Examiner* — Chi Pham
*Assistant Examiner* — Soon-Dong Hyun
(74) *Attorney, Agent, or Firm* — Kramer & Amado P.C.

(57) ABSTRACT

Various exemplary embodiments are a method and related device and computer-readable medium including one or more of the following: receiving a packet sent from the source node to the destination node; associating the packet with an active flow by accessing information in the packet; performing deep packet inspection (DPI) to identify an application associated with the active flow; determining a classification for the packet based on characteristics of the identified application; associating, with the packet, information identifying the classification; forwarding the packet including the information identifying the classification towards the destination node; and performing processing on the packet at a downstream device by extracting the classification from the packet.

25 Claims, 4 Drawing Sheets

USE OF DPI TO EXTRACT AND FORWARD APPLICATION CHARACTERISTICS

FIELD OF THE INVENTION

This invention relates generally to communication of information regarding characteristics of an application associated with a data packet.

DESCRIPTION OF RELATED ART

As streaming video, peer-to-peer networking, and other high bandwidth applications become the norm, the burdens placed on the underlying network architecture increase exponentially. When designing the congestion management systems, service providers did not contemplate the use of the Internet for streaming video, peer-to-peer applications, and other high bandwidth uses. As a result, when a large number of users run high-bandwidth applications, the best effort, high oversubscription rate architecture frequently experiences congestion, thereby interfering with the user experience.

These problems are particularly salient in the context of mobile networks, where bandwidth is even more limited. Mobile networks are seeing a gradual transformation from voice-only services to data or mixed voice-data services. As per-user bandwidth requirements have increased, the burdens placed on the mobile network architecture have also increased.

Service providers, particularly mobile network service providers, must therefore decide between several options: continue providing best effort service; increase bandwidth and essentially become a transport "utility"; or sell application-specific services based on the requirements of the individual users. Service providers view the first two options as unsatisfactory, as users are dissatisfied with best effort service, while indiscriminately increasing bandwidth would result in additional costs to the service provider with no corresponding increase in revenue. Selling application-specific services, on the other hand, would allow users to pay for the services they desire to receive, while eliminating the need for the service provider to exponentially increase bandwidth.

In order to sell application-specific services, however, service providers must first modify the underlying network architecture to identify and gather information about applications. In the radio portion of mobile networks, the use of per-application traffic management is especially critical, as bandwidth is limited due to the inherent restrictions of radio frequencies. Consequently, mobile operators frequently utilize packet marking, such as Type of Service (ToS) marking to prioritize and forward packets.

In existing mobile network architectures, however, the network relies on end-user equipment for proper marking of packets. Thus, for example, a user's mobile handset could mark voice packets as having a higher priority than data packets, thereby ensuring the quality of calls placed over the mobile network.

In these current implementations, because the network relies on end-user equipment to mark packets, the mobile network cannot effectively prioritize packets without involvement of end-user equipment supported by the mobile network. In addition, because values must be predefined and implemented in the end-user equipment, the mobile network operator lacks the flexibility to define new applications and markings without modifying the behavior of the end-user equipment. Furthermore, current implementations rely on packet marking protocols that include only a limited number of unique values, such that the network can effectively manage only a small number of applications.

Still further, current implementations treat all data packets associated with an application in the same manner. For example, a current implementation might modify a quality of service assigned to every packet in a data flow. Accordingly, current implementations fail to consider that some packets associated with an application flow are more important than others and therefore fail to most efficiently utilize bandwidth in the network.

Accordingly, there is a need for an in-line device that identifies characteristics of applications associated with data packets and conveys this information for downstream processing. There is also a need for associating application characteristic information with data packets without requiring the packet to be marked at end-user equipment. In addition, there is a need for packet marking in a mobile network that utilizes a packet marking scheme such that a large number of applications and application characteristics may be identified at any location in the network, without requiring Deep Packet Inspection (DPI) processing to be performed at each location. Furthermore, there is a need for identifying characteristics of applications to allow downstream processing of packets based on the importance of the packets to the application flow.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

SUMMARY OF THE INVENTION

In light of the present need for in-band DPI application awareness propagation enhancements, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

In various exemplary embodiments, a DPI device is placed in-line in a non-mobile portion of a mobile network, such that packets pass through the DPI device prior to being forwarded. Thus, in various exemplary embodiments, the DPI device identifies and classifies traffic passing through the mobile network based on information extracted from the header and/or data portion of the incoming packets. Using the information extracted from the packets, the DPI device may add an application classification to the packets, thereby allowing downstream devices to identify the packet and perform application-specific processing.

Accordingly, in various exemplary embodiments, a method of processing packets sent from a source node to a destination node and a related computer-readable medium comprise: receiving a packet sent from the source node to the destination node; associating the packet with an active flow by accessing information in the packet; performing deep packet inspection (DPI) to identify an application associated with the active flow; determining a classification for the packet based on characteristics of the identified application; associating, with the packet, information identifying the classification; forwarding the packet including the information identifying the classification towards the destination node; and performing processing on the packet at a downstream device by extracting the classification from the packet.

In various exemplary embodiments, the packet is an IP packet and the information identifying the classification is placed in a header extension of the IP packet. Alternatively, in various exemplary embodiments, the packet is formatted according to a proprietary protocol and the information identifying the classification is placed in a proprietary protocol extension of the packet. In addition, in various exemplary embodiments, the packet is a Generic Routing Encapsulation (GRE) packet and the information identifying the classification is placed in a key field of the GRET packet or a sequence number of the GRE packet.

In various exemplary embodiments, the step of determining a classification for the packet considers at least one of an effect of the packet on a user experience and an importance of the packet to an application. Furthermore, in various exemplary embodiments, the step of performing processing on the packet at a downstream device comprises performing a traffic management function on the packet, which may include dropping the packet and modifying a quality of service associated with the packet.

Finally, in various exemplary embodiments, a device for processing traffic in a network comprises: a communication module that receives and forwards a packet sent from a source node to a destination node; and a processor configured to identify an active flow associated with the packet by accessing information stored in the packet, perform deep packet inspection (DPI) to identify an application associated with the active flow, determine a classification for the packet based on characteristics of the identified application, and associate, with the packet, information identifying the classification, wherein the information identifying the classification is extracted from the packet by a downstream device.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
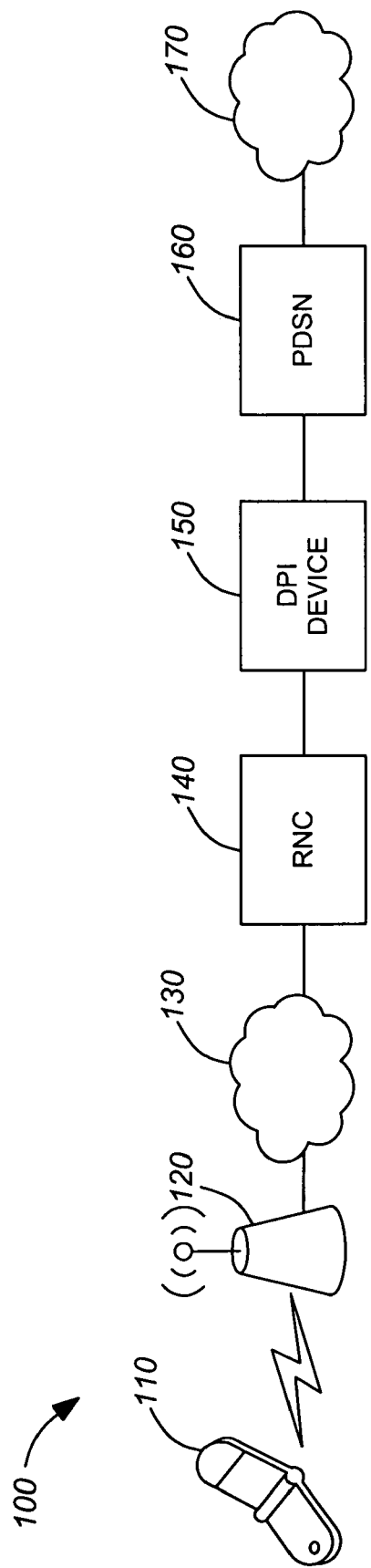
FIG. 1 is a schematic diagram of an exemplary mobile network utilizing in-line DPI in a mobile part of a network.

Referring now to the drawings, in which like numerals refer to like components or steps, there are disclosed broad aspects of various exemplary embodiments.

FIG. 1 is a schematic diagram of an exemplary mobile network 100 utilizing in-line DPI in a mobile part of the network 100. Exemplary mobile network 100 includes user node 110, wireless base station 120, network 130, radio network controller 140, deep packet inspection device 150, packet data serving node 160, and network 170.

In various exemplary embodiments, user node 110 is a device operated by a user that enables access to mobile network 100. More specifically, in various exemplary embodiments, user node 110 is a cell phone, personal digital assistant, personal or laptop computer, wireless email device, or any other device that supports wireless communications. Furthermore, in various exemplary embodiments, user node 110 generates and sends data packets related to one or more applications.

In various exemplary embodiments, wireless base station 120 is a device including an antenna to wirelessly exchange data with user node 110 over a plurality of radio channels. Furthermore, wireless base station 120 includes a wire line interface to forward data into network 130. Thus, in various exemplary embodiments, wireless base station 120 is a Node B in a 3G network or another base transceiver station communicating in a Global System for Mobile Communications (GSM), Universal Mobile Telecommunications System (UMTS), Long Term Evolution (LTE), or other wireless network.

Additionally, in various exemplary embodiments, network 130 provides a connection between wireless base station 120 and radio network controller 140. It should be apparent that network 130 may be any network capable of sending data and requests between wireless base station 120 and radio network controller 140. Accordingly, network 130 may comprise a plurality of routers, switches, bridges, and other components suitable for receiving and forwarding data packets.

In various exemplary embodiments, radio network controller 140 controls and manages a plurality of wireless base stations 120. Thus, radio network controller 140 directs the transmission and reception of data in wireless base station 120 by controlling the radio transmitters and receivers in wireless base station 120. Furthermore, in various exemplary embodiments, radio network controller 140 receives and transmits packet-switched data between wireless base station 120 and packet data serving node 160. It should be apparent that radio network controller 140 may be replaced by a base station controller or another device capable of directing the operation of wireless base station 120 and receiving and transmitting data packets.

In various exemplary embodiments, radio network controller 140 utilizes application information inserted into a data packet by deep packet inspection device 150 to manage the flow of data. More particularly, in various exemplary embodiments, radio network controller 140 identifies a classification of a packet inserted by DPI device 150 and performs quality of service processing based on the classification, such as determining whether to allow or drop the packet.

In addition, in various exemplary embodiments, mobile network 100 includes a deep packet inspection device 150 that intercepts, "sniffs," or otherwise receives packets transmitted from user node 110 to a destination in network 170 or from a point in network 170 to user node 110. More specifically, as described further below with reference to FIG. 6, DPI device 150 receives a packet, identifies characteristics of an application associated with the packet, and adds a marking or other information to the packet to allow downstream application-specific processing and forwarding.

In various exemplary embodiments, DPI device 150 comprises specialized hardware and/or software that is capable of examining data packets received from or transmitted to radio network controller 140 to identify information associated with the packets. Thus, in various exemplary embodiments, DPI device 150 includes a storage medium that stores information used to identify flows, a processor for performing analysis, and a communication module to receive and transmit packets.

In addition, in various exemplary embodiments, DPI device 150 is integrated into radio network controller 140, packet data switching node 160, a network element that is part of a network (not shown) providing connectivity between radio network controller 140 and packet data switching node 160, or into a network element that is part of network 170. In various exemplary embodiments, the network providing connectivity comprises a plurality of routers, switches, bridges, and other components suitable for receiving and forwarding data packets. Alternatively, in various exemplary embodiments, DPI device 150 is placed or integrated into wireless base station 120 or a network element that is part of network 130.

In various exemplary embodiments, DPI device 150 examines any combination of information in layers 2 through 7 of the Open Systems Interconnection (OSI) model. Thus, in various exemplary embodiments, DPI device 150 performs a "deep" analysis of one or more packets in order to identify an application associated with the packets. For example, DPI device 150 may analyze a packet to determine whether the packet relates to email, streaming video, web browsing, peer-to-peer transfer, or any other application of interest to the service provider. In addition, in various exemplary embodiments, DPI device 150 classifies the packet based on underlying characteristics of the application, such as the compression scheme, data structure, or any other application characteristic. Furthermore, in various exemplary embodiments, DPI device 150 performs traffic management operations, then forwards the packet to radio network controller 140 or to packet data serving node 160.

It should be apparent, that although illustrated as a standalone device, in various exemplary embodiments, DPI device 150 is a component integrated into a router. Thus, in various exemplary embodiments, DPI device 150 analyzes each packet received by the router before the router forwards the packet to the next hop. Furthermore, in various exemplary embodiments, DPI device 150 instead resides between packet switching data node 160 and network 170.

Furthermore, it should be apparent that DPI device 150 is illustrated as directly connected to radio network controller 140 and packet data serving node 160 for the sake of simplicity. Accordingly, in various exemplary embodiments, one or more switches, routers, bridges, or other network elements are placed between DPI device 150 and radio network controller 140 or packet data serving node 160.

In various exemplary embodiments, packet data serving node 160 serves as a connection between mobile network 100 and one or more IP networks (not shown). Thus, in various exemplary embodiments, packet data serving node 160 forwards packets between the Internet and radio network controller 140. It should be apparent that packet data serving node 160 may be replaced by a Gateway General Packet Radio Service Support Node (GGSN), a Serving Gateway General Packet Radio Service Support Node (SGSN), Access Serving Gateway, or any other node capable of providing a connection between mobile network 100 and an IP network.

In various exemplary embodiments, network 170 receives data from and transmits data to packet data serving node 160. Thus, in various exemplary embodiments, network 170 comprises a plurality of routers, switches, bridges, user nodes and other components suitable for sending, receiving and forwarding data packets.

As described further below with reference to FIG. 6, packet data serving node 160, radio network controller 140, or one or more network elements that are part of network 130, 170 or a network between radio network controller 140 and packet data serving node 160 utilize application characteristic information inserted into a data packet by deep packet inspection device 150 to manage the flow of data. More particularly, in various exemplary embodiments, any of the above mentioned nodes identifies the application and associated characteristics using information found in the data packet and performs quality of service processing, such as determining whether to allow or drop the packet upon congestion.

It should be apparent that, although illustrated as a 3G wireless mobile network, network 100 may be a different type network. Thus, in various exemplary embodiments, network 100 is a cellular network operating under a different standard, a satellite network, a wired network, or some other type of network in which application-specific processing is desired.

Figure 2:
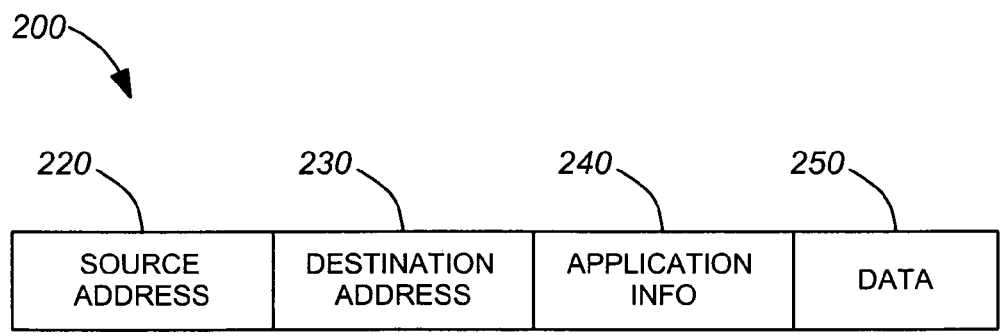
FIG. 2 is a schematic diagram of an exemplary L3 packet including a field for storing application information.

FIG. 2 is a schematic diagram of an exemplary L3 packet 200 including one or more fields for storing application information. In various exemplary embodiments, L3 packet 200 includes, among other fields, packet header 210, source address 220, destination address 230, application information 240, and data 250.

In various exemplary embodiments, packet header 210 includes data used to forward packet 200 from a source to a destination. Thus, in various exemplary embodiments, packet header 210 includes a source address 220, which may include a source IP address and a source port. Furthermore, in various exemplary embodiments, packet header 210 includes destination address 230, which may include a destination IP address and a destination port.

Furthermore, packet 200 includes application information 240, which, in various exemplary embodiments, identifies an application associated with packet 200. In various exemplary embodiments, application information 240 is placed into an IP header extension, which may be an additional header inserted between packet header 210 and data 250 of packet 200. Thus, in various exemplary embodiments, application information 240 consists of one or more type length values (TLV) indicating a name, alphanumeric identifier, or other information identifying an application associated with packet 200.

Furthermore, in various exemplary embodiments, application information 240 includes an alphanumeric value that classifies the packet based on importance, priority, or any other characteristic of the underlying application. It should be apparent that, instead of an alphanumeric value, any information suitable for identifying the application and associated characteristics may be placed in application information 240.

Furthermore, it should be apparent that packet header 210 is shown as including only source address field 220 and destination address 230 for the sake of simplicity. Thus, in various exemplary embodiments, packet header 210 includes additional fields including, but not limited to, a protocol number, traffic class, flow label, payload length, next header, and hop limit. Furthermore, it should be apparent that packet 200 may be an IP packet, Transmission Control Protocol (TCP) packet, User Datagram Protocol (UDP) packet, a packet formatted according to a proprietary protocol, or a packet formatted in any other protocol that may be modified to include application information and classification information.

Figure 3:
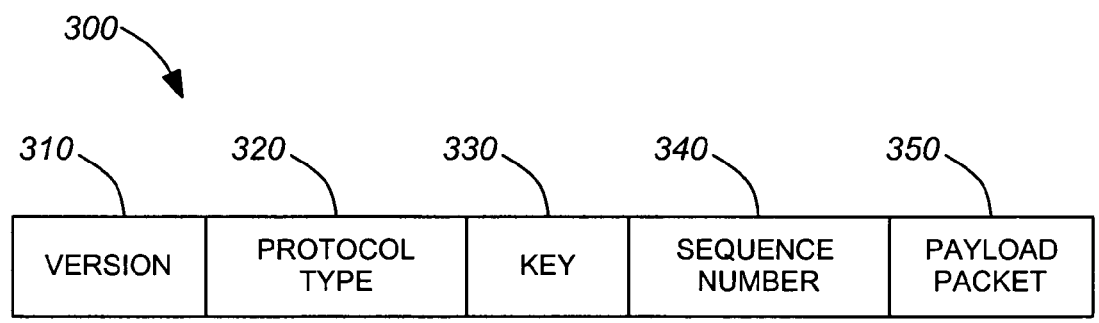
FIG. 3 is a schematic diagram of an exemplary GRE packet including key and sequence number fields.

FIG. 3 is a schematic diagram of an exemplary Generic Routing Encapsulation packet 300 including key and sequence number fields. GRE is a tunneling protocol used to encapsulate network layer packets inside of an IP tunneling packet. Thus, in various exemplary embodiments, GRE packet 300 includes, among other fields, version 310, protocol type 320, key 330, sequence number 340, and payload packet 350.

GRE packet 300 includes version 310, which specifies a GRE protocol version with which the packet is associated. Furthermore, GRE packet 300 includes protocol type 320, which specifies the underlying protocol used for the packet encapsulated as payload packet 350.

In addition, in various exemplary embodiments, GRE packet 300 includes key 330, which is a field inserted by the device or party that performs the encapsulation. Thus, in various exemplary embodiments, prior to forwarding packet 300, DPI device 150 inserts application information into key 330. Furthermore, in various exemplary embodiments, key 330 includes an alphanumeric value that identifies an importance, priority, or other characteristic of the packet based on analysis of the underlying application. Accordingly, devices or parties that receive packet 300 downstream may extract the application information from key 330 and perform application-specific processing based on the identified application and application characteristics.

Furthermore, in various exemplary embodiments, GRE packet 300 includes sequence number 340, which is a field inserted by the device or party that performs the encapsulation. Sequence number 340 may be used to establish the order in which packets have been transmitted to the receiving device. Alternatively, in various exemplary embodiments, prior to forwarding packet 300, DPI device 150 inserts application information and/or application characteristic information into sequence number 340. Accordingly, devices or parties that receive packet 300 downstream may extract the application information from sequence number 340 and perform application-specific processing based on the identified application and application characteristics.

In various exemplary embodiments, GRE packet 300 also includes payload packet 350, which stores a packet that is encapsulated and routed. Accordingly, information contained in a delivery header (not shown) is used to forward packet 300 from a source node to a destination node, while ignoring the routing information contained in payload packet 350.

Figure 4:
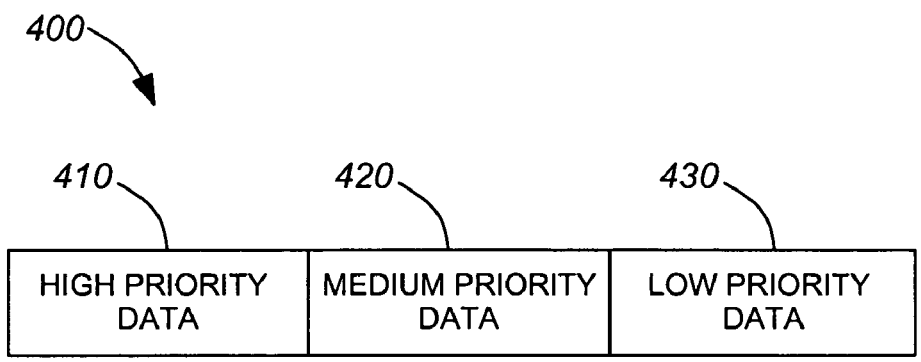
FIG. 4 is a schematic diagram of an exemplary set of data frames associated with an application.

FIG. 4 is a schematic diagram of an exemplary set of data frames 400 associated with an application. Thus, exemplary set of data frames 400 includes high priority data frame 410, medium priority data frame 420, and low priority data frame 430.

Thus, as illustrated in FIG. 4, data associated with a particular application may be classified into multiple groups. In various exemplary embodiments, data frames associated with an application are grouped based on importance to the user experience, needs of the application, frames types used for an encoding scheme, or some other criterion. Accordingly, as described further below with reference to FIG. 6, DPI device 150 receives a data packet, analyzes the packet to determine underlying characteristics, and associates the determined application characteristics with the packet.

It should be apparent that data frames 400 may be associated with any application in which some frames have a greater effect on the user experience or should somehow be treated differently as they are forwarded through the network. Thus, data frames 400 may be MPEG-4 data frames, described in detail below with reference to FIG. 5. Alternatively, in various exemplary embodiments, data frames 400 are encoded in another video format, such as Windows Media, a Real Media, or QuickTime. Furthermore, in various exemplary embodiments, data frames 400 are audio files in a format such as MP3 Audio, Ogg Vorbis Audio, Windows Media, or any other audio encoding format. It should be apparent, however, that data frames 400 are not limited to audio and video files.

It should also be apparent that an application may have any positive integer number of priorities or classes of data. Furthermore, any characteristic of the underlying application may be used to classify, group, or otherwise characterize data frames received by DPI device 150.

Figure 5:
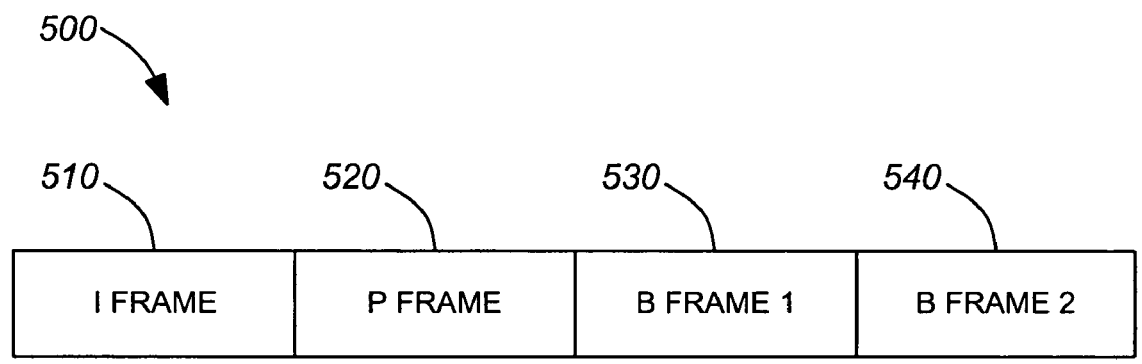
FIG. 5 is a schematic diagram of an exemplary set of MPEG-4 data frames.

FIG. 5 is a schematic diagram of an exemplary set of MPEG-4 data frames 500. In various exemplary embodiments, video encoded according to the MPEG-4 standard includes three types of frames: I frames, B frames, and P frames. Thus, exemplary set 500 includes I frame 510, P frame 520, B frame 1 530, and B frame 2 540.

I frame 510, also called an Intra-frame, provides a full frame of data and can therefore be decoded without referencing another frame. P frame 520, also called a predicted frame, is deduced from the last frame, which in set 500 is I frame 510. B frame 1 530 and B frame 2 540, also called bidirectional predicted frames, are deduced from the previous and next I or P frames. Thus, although P frame 520 is located after B frames 530, 540, P frame 520 must be sent to the decoder prior to B frames 530, 540.

Accordingly, to provide the best possible experience when streaming an MPEG-4 video during periods of network congestion, the user should receive I frames with the highest priority, P frames with a medium priority, and B frames with a lowest priority. Thus, as described further below with reference to FIG. 6, when DPI device 150 receives a data packet associated with a flow identified as an MPEG-4 video stream, DPI device 150 analyzes the packet to determine the type of frame. Prior to forwarding the packet, DPI device 150 associates, with the packet, information identifying the application and/or classification information identifying the type of frame. The classification information associated with the frame may then be used by a downstream device to provide preferential treatment to I frames.

Figure 6:
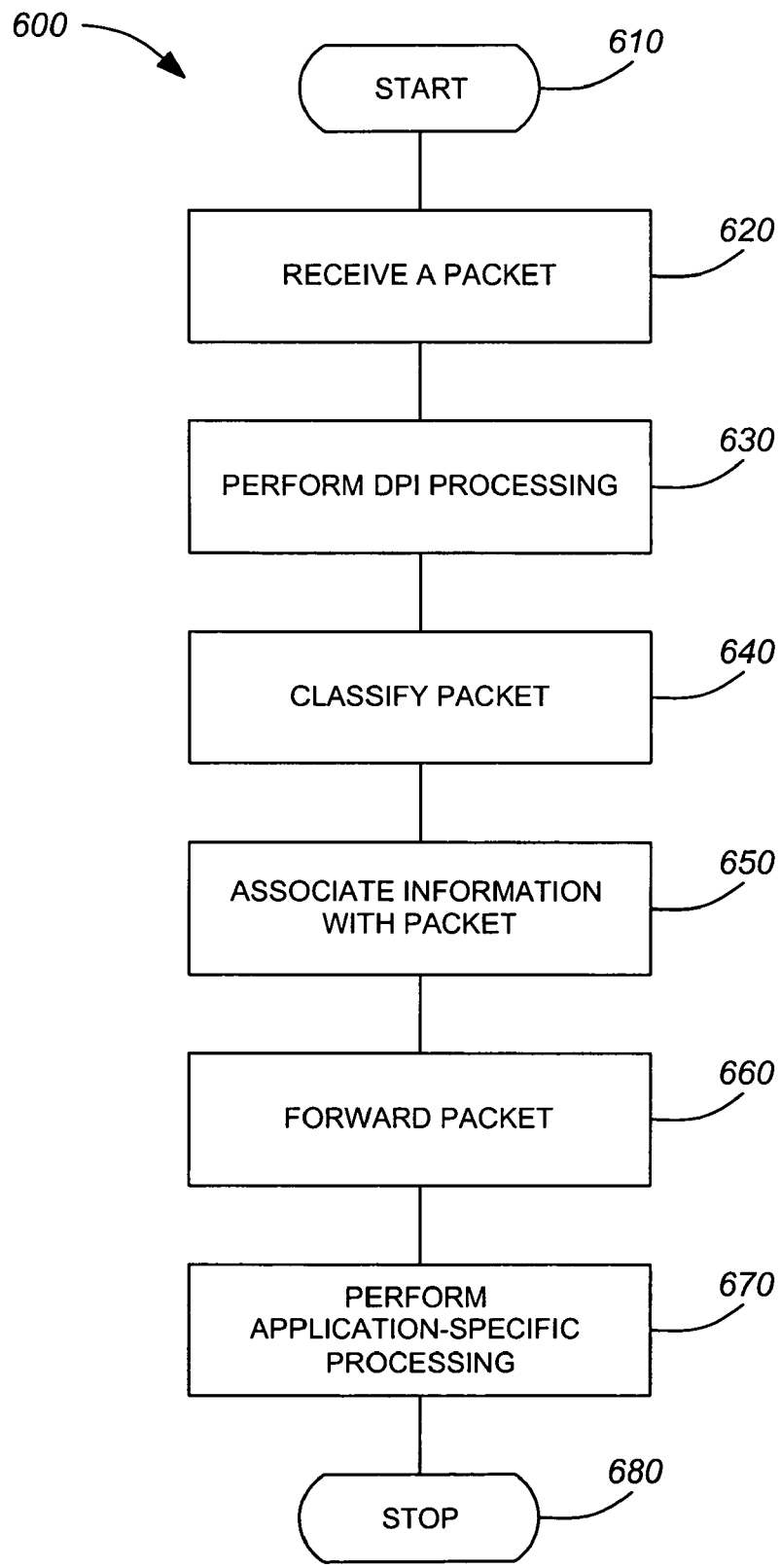
FIG. 6 is a flowchart of an exemplary embodiment of a method for using deep packet inspection to extract and forward application characteristics.

FIG. 6 is a flowchart of an exemplary embodiment of a method 600 for using deep packet inspection to extract and forward application characteristics. Exemplary method starts in step 610 and proceeds to step 620, where DPI device 150 intercepts, sniffs, or otherwise receives a packet transmitted from a source node to a destination node.

Exemplary method 600 then proceeds to step 630, where DPI device 150 identifies a flow associated with the packet using header information from the packet, then performs DPI processing on the identified flow. Thus, in various exemplary embodiments, DPI device 150 examines any combination of information in OSI layers 3 through 7 of one or more packets to identify an application associated with the flow. For example, DPI device 150 may analyze one or more packets to determine whether the flow relates to email, streaming video, web browsing, peer-to-peer transfer, Voice over IP (VoIP), or any other application of interest to the service provider. In various exemplary embodiments, the analysis performed by DPI device 150 includes at least one of signature and pattern matching, stateful monitoring, behavioral analysis, and statistical analysis.

After identifying the flow in step 630, exemplary method 600 proceeds to step 640, where DPI device 150 classifies the particular packet based on a priority or other characteristic of the packet. Thus, in various exemplary embodiments, DPI device 150 determines the importance of the packet to the user experience, the needs of the application, or some other criterion. DPI device 150 then generates, retrieves, or otherwise determines an alphanumeric value to represent the identified priority or characteristic.

After classifying the packet in step 640, exemplary method 600 proceeds to step 650, where DPI device 150 associates application information and/or application characteristics with the packet. Thus, in various exemplary embodiments, DPI device 150 adds an alphanumeric value identifying the application associated with the flow. Furthermore, in various exemplary embodiments, DPI device 150 adds an alphanumeric value identifying the classification of the packet.

More particularly, DPI device 150 may add the identifiers to an IP header extension or a proprietary protocol extension. Alternatively, DPI device 150 may add the identifiers to at least one of a key field and a sequence number field of a GRE packet header. It should be apparent that, in various exemplary embodiments, DPI device 150 adds the application identifier to any field in the packet, provided that a downstream device may extract the application information.

After DPI device 150 adds application information to the packet in step 650, exemplary method 600 proceeds to step 660, where DPI device 150 forwards the packet. Thus, in various exemplary embodiments, DPI device 150 extracts routing information from the packet and sends the packet based on the extracted routing information.

Exemplary method 600 then proceeds to step 670, where a downstream device receives the packet containing the application classification and performs application-specific processing. It should be apparent that, in various exemplary embodiments, the downstream device may be a radio network controller, packet data serving node, or any other network element at which application-specific processing is desired. Thus, in various exemplary embodiments, the downstream device receives the packet, extracts the previously encoded application information from the packet, and identifies the packet priority and processing based on the application information. Moreover, in various exemplary embodiments, the downstream device extracts the application classification from the packet.

In various exemplary embodiments, the application-specific processing performed in step 670 includes traffic management operations. Accordingly, the downstream device may access a service level agreement associated with the subscriber located at the source node to determine how to treat packets in the identified flow. Based on this determination, the downstream device may determine how to treat the packet, including whether to allow the packet to proceed or whether the packet should instead be dropped. Alternatively, the downstream device may associate a Quality of Service (QoS) marking with the packets, such as a Differentiated Services Code Point (DSCP).

In addition, in various exemplary embodiments, the application-specific processing includes analysis based on the underlying characteristics of the particular packet. Thus, for example, the downstream device may determine the priority or importance of the packet to the particular flow by accessing the classification. Based on this determination, the downstream device may determine how to treat the individual packet, including whether to allow the packet to proceed or whether the packet should instead be dropped.

For example, when the downstream device determines that the packet is very important based on the extracted application classification, the downstream device may, for example, mark the packet with a higher DSCP value to indicate that the packet should be given high priority. Alternatively, when the downstream device determines that the packet is not as important, the downstream device may mark the packet with a lower DSCP value or drop the packet altogether upon congestion.

It should be apparent that although described with reference to marking and dropping packets, the downstream device may perform any application-specific processing without a need to understand or determine the application itself. Thus, the downstream device may, for example, drop packets, collect statistics, and manage billing. After performing packet-specific processing based on encoded application information in step 670, exemplary method 600 proceeds to step 680, where exemplary method 600 stops.

According to the forgoing, various exemplary embodiments include a DPI device that identifies and analyzes a flow, and associates application information and application characteristics with the packet. Furthermore, in various exemplary embodiments, the DPI device forwards the packet along with the application information and characteristics to a downstream node. Accordingly, in various exemplary embodiments, a downstream device may perform application-specific processing based not only on the identified application, but also based on the particular characteristics of the underlying packets in the application flow without a need to perform DPI processing.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of processing packets sent from a source node to a destination node, the method comprising:
   receiving a packet sent from the source node to the destination node;
   associating the packet with an active flow by accessing information in the packet;
   performing deep packet inspection (DPI) to identify an application associated with the active flow by analyzing at least one other packet;
   determining a classification for the packet based on characteristics of the identified application;
   inserting information identifying the classification into the packet;
   forwarding the packet, including the information identifying the classification, towards the destination node such that a downstream device is enabled to perform processing of the packet by extracting the classification from the packet.

2. The method of claim 1, wherein the packet is an IP packet, and further comprising:
   placing the information identifying the classification in a header extension of the IP packet.

3. The method of claim 1, further comprising:
   formatting the packet according to a proprietary protocol; and
   placing the information identifying the classification in a proprietary protocol extension of the packet.

4. The method of claim 1, wherein the packet is a Generic Routing Encapsulation (GRE) packet.

5. The method of claim 4, further comprising:
   placing the information identifying the classification in a key field of the GRE packet.

6. The method of claim 4, further comprising:
placing the information identifying the classification in a sequence number field of the GRE packet.

7. The method of claim 1, wherein the step of determining the classification for the packet further comprises:
considering at least one of an effect of the packet on a user experience and an importance of the packet to the identified application.

8. The method of claim 1, wherein the step of performing processing on the packet at the downstream device further comprises:
performing a traffic management function on the packet.

9. The method of claim 8, wherein the traffic management function further comprises:
dropping the packet.

10. The method of claim 8, wherein the traffic management function further comprises:
modifying a quality of service associated with the packet.

11. The method of claim 1, further comprising:
selecting the application associated with the active flow from the group consisting of an audio application and a video application.

12. The method of claim 1, wherein the at least one other packet belongs to the active flow.

13. The method of claim 1, wherein the at least one other packet belongs to a flow other than the active flow.

14. The method of claim 1, wherein the step of performing DPI to identify an application comprises at least one of the following: signature matching, pattern matching, stateful monitoring, behavioral analysis, and statistical analysis.

15. The method of claim 1, wherein, in performing DPI to identify an application, the processor is configured to perform at least one of the following: signature matching, pattern matching, stateful monitoring, behavioral analysis, and statistical analysis.

16. A device for processing traffic in a network, the device comprising:
a communication module that receives and forwards a packet sent from a source node to a destination node; and
a processor configured to:
identify an active flow associated with the packet by accessing information stored in the packet,
perform deep packet inspection (DPI) to identify an application associated with the active flow analyzing at least one other packet,
determine a classification for the packet based on characteristics of the identified application, and
insert information identifying the classification into the packet such that a downstream device is enabled to extract the information identifying the classification from the packet.

17. The device of claim 16, wherein the packet is an IP packet and the information identifying the classification is placed in a header extension of the IP packet.

18. The device of claim 16, wherein the packet is formatted according to a proprietary protocol and the information identifying the classification is placed in a proprietary protocol extension of the packet.

19. The device of claim 16, wherein the packet is a Generic Routing Encapsulation (GRE) packet.

20. The device of claim 19, wherein the information identifying the classification is placed in a key field of the GRE packet.

21. The device of claim 19, wherein the information identifying the classification is placed in a sequence number field of the GRE packet.

22. The device of claim 16, wherein the processor determines a classification for the packet by considering at least one of an effect of the packet on a user experience and an importance of the packet to the identified application.

23. The device of claim 16, wherein the downstream device performs a traffic management function on the packet.

24. The device of claim 16, wherein the at least one other packet belongs to the active flow.

25. The device of claim 16, wherein the at least one other packet belongs to a flow other than the active flow.

* * * * *